May 20, 1969
E. H. OLSON ET AL
3,445,282
INSULATED ELECTRICAL CONDUCTORS AND THE
METHOD FOR PRODUCING THE SAME
Filed Oct. 5, 1964
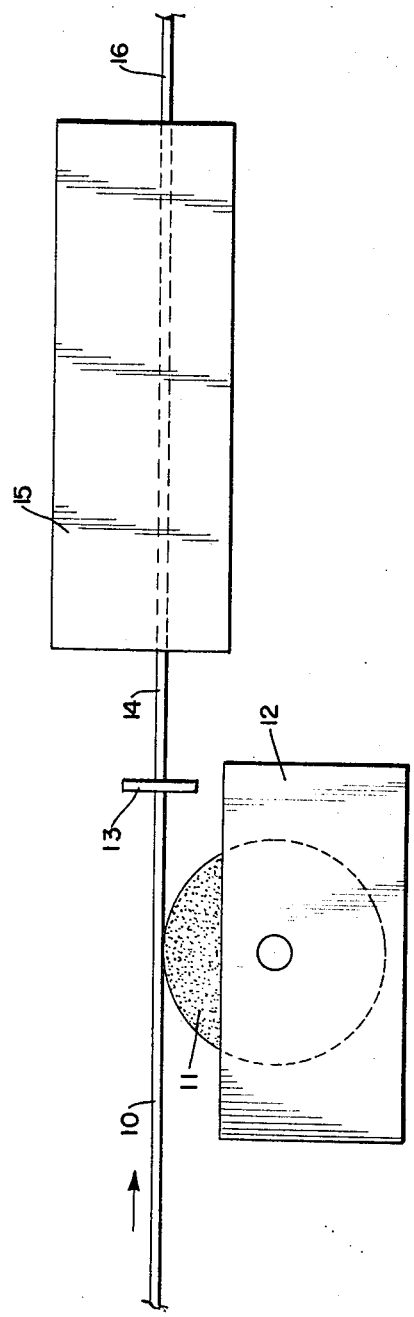
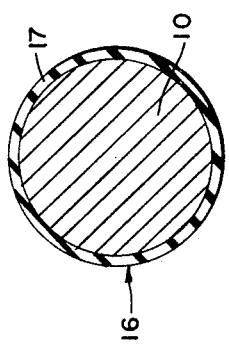
INVENTORS
EMIL H. OLSON
WILLIAM W. ULMER
RICHARD L. CHRISTENSEN
BY
ATTORNEYS 3,445,282
INSULATED ELECTRICAL CONDUCTORS AND
THE METHOD FOR PRODUCING THE SAME
Emil H. Olson, North Muskegon, and William W. Ulmer
and Richard L. Christensen, Muskegon, Mich., assignors
to Anaconda Wire and Cable Company, New York,
N.Y., a corporation of Delaware
Filed Oct. 5, 1964, Ser. No. 402,690
Int. Cl. B44d 1/42
U.S. Cl. 117—232               23 Claims

ABSTRACT OF THE DISCLOSURE

A 100% solid epoxy composition containing rigid and flexible epoxy resins is used to prepare magnet wire. The coated wire is cured at a high temperature above the flashing point of the epoxy resins for a duration less than required for the degradation of the coating.

---

This invention relates to insulated electrical conductors and, more particularly, it relates to solvent-free epoxy coated magnet wires and the method for producing the same.

Epoxy resins which have outstanding chemical, moisture, oxidation, and abrasive resistance have been used extensively as an enamel for magnet wire. Up to the present, the epoxy coated magnet wires are produced exclusively by solution coating techniques. The solution coatings employ a solvent system containing about 30% to 50% epoxy resin. The solvent serves as a fluid carrier for the resin enabling convenient deposition of a smooth continuous film on the surface of the wire. In order to provide the necessary build-up, hence the dielectric strength of the enamel coating, 4 to 6 coatings are generally required. The solvent is subsequently evaporated and is seldom recovered for further use. Due to the multiple coating required, a slow baking schedule is employed which can provide escape of the solvent from the coatings, thus eliminating the pinhole failures in the coated film. The slow baking schedule combined with the large amount of solvent losses add considerably to the cost of producing this type of magnet wire.

While solvent-free or 100 percent solids coatings based on the liquid epoxy resins have been used for some coating work, such as an adhesive coating for insulated electrical conductors, their use in coating a bare electrical conductor has not been successful. Although most of the 100 percent solids coatings provide the required dielectric strength for magnet wires, they fail completely in the shock tests and the prescribed IEEE test for magnet wires. Furthermore, considerable difficulties are encountered in the application of the 100 percent solids formulation to the bare electrical conductor. The liquid epoxy resins which have the desirable chemical and physical properties have relatively high viscosity for the conventional wire coater. Attempts to raise the temperatures to reduce the viscosity of the resins promote crosslinking of the resins, which reduces the pot life of the resins to a duration not applicable for commercial use.

We have now found that these difficulties can be completely overcome using the method of the present invention. Broadly stated, this method comprises covering an electrical conductor with a substantially solvent-free coating composition containing a rigid epoxy resin, a flexible epoxy resin and a $BF_3$ organic complex curing agent. The resinous covering is cured onto the conductor at a temperature substantially above the flash point of the coating composition for a period shorter than that required for the degradation of the resin composition. The resultant magnet wire with the $BF_3$ organic complex cured epoxy composition exhibits flexibility, good adhesion to the metallic conductor, high thermoplastic flow temperature, excellent dielectric strength, solvent resistance, good abrasive resistance, and high burnout characteristics. Furthermore, using a baking temperature substantially higher than the normal degradation of the epoxy resins and an extremely short curing time, the production of a conventional magnet wire coater is substantially increased.

A number of rigid epoxy resins are suitable for the present invention. They are characterized by the repeating chains of a relatively large number of aromatic rings in the resinous molecules which account for the rigidity of the epoxy resin. Among them, for example, are diglycidyl ethers of bis-phenol A and its homologues, glycidyl ethers of bis-phenol F, glycidyl ethers of tetrakis (hydroxyphenyl) ethane and epoxylated novolacs. These epoxy resins are well known and available commercially under a variety of trade names and grades. Table 1 lists a number of rigid epoxy resins that are found to be eminently suitable for the present invention.

TABLE 1.—RIGID EPOXY RESINS

| Resin Type | Epoxy Equivalent | Average Molecular Weight | Viscosity 25° C., Centipoises |
|---|---|---|---|
| Bakelite Co.: | | | |
| ERL-2774 | 185–200 | 350–400 | 10,500–19,500 |
| ERL-3794 | 170–182 | 350–400 | 7,200–19,200 |
| Ciba Co. Inc.: Araldite 502 | 250 | | 3,000 |
| The Dow Chem. Co.: | | | |
| DER 331 | 187–193 | 350–400 | 11,000–16,000 |
| DER 332 | 173–179 | 340–350 | 3,600–6,400 |
| DER 334 | 179–194 | | 500–900 |
| DEN 438 | 175–182 | | 19,000,000 |
| Jones-Dabney Co.: | | | |
| Epi Rez 508 | 171–177 | 300 | 3,600–5,500 |
| Epi Rez 510 | 180–200 | 350–400 | 9,000–18,000 |
| Shell Chem. Co.: | | | |
| Epon 562 | 140–165 | 300 | 150–210 |
| Epon 815 | 175–210 | 340–400 | 500–900 |

The flexible epoxy resin that can be used in the present invention is also available commercially. Generally, they are long chain diepoxies, in some instances triepoxies, containing long aliphatic chains which provide the flexibility for these resins. The degree of flexibility is generally determined by the amount of aliphatic chains included in the resinous molecule. Among the flexible epoxy resins that we found to be suitable are the Dow Chemical Company DER 732 and DER 736, Shell Chemical Company Epon 872, and the Jones-Dabney Epi Rez 5145.

The Dow flexible epoxy resins are described as polyglycol diepoxies with the following theoretical formula structure:

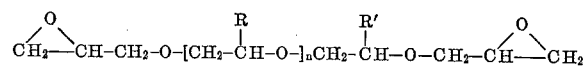

wherein R and R' is hydrogen or hydrocarbon radicals and $n$ is an integer from 1 to 11. These resins have the following product specifications:

| Property | DER 732 | DER 736 |
|---|---|---|
| Epoxy Equiv. Wt | 305–335 | 175–205 |
| Visc. 20° C., cps | 55–100 | 30–60 |
| Color Gardner, max | 1 | 1 |
| Specific Gravity, 25/25° C | 1.06 | 1.14 |
| Lbs./Gal | 8.9 | 9.5 |

The Shell Chemical Epon 872 is a condensate or a chemical adduct of an excess epoxy resin and a polycarboxylic acid with a linear structure as described in Newey U.S.

Patent No. 2,970,983. The product specification is as follows:

| Color, 25° C. Gardner [1] | Viscosity Poises, 25° C. [2] | Epoxide Equivalent [3] |
|---|---|---|
| 10 max | 15–25 | 650–750 |

[1] Color of transparent liquids, SMS 456 (ASTM D1544-58T); 75% wt. solution of Epon 872 in xylene.
[2] Kinematic viscosity, SMS 170 (ASTM D445-53T); 75% wt. solution of Epon 872 in xylene.
[3] Grams of resin containing one gram-equivalent of epoxide; SMS 766 (ASTM D1652-59T).

The Epi Rez 5145 is also a diepoxy with a linear molecular structure which has the following product specifications:

| Property | Min. | Test Methods |
|---|---|---|
| Solids, percent | 100 | |
| Wt./Gallon | 8.83 | |
| Specific Gravity, at 25° C | 1.104 | ASTM D891-59 Hydrometer method preferred. |
| Wt. per Epoxide | 674–690 | |
| Color (Gardner) | 5–6 at 75% n.v. in xylol. | |

The ratio of the rigid to the flexible epoxy resins in the resinous composition of this invention can be varied considerably depending on the properties desired in the final product. The relative amount of flexible epoxy resin in the composition influences the flexibility of the final coating. Optimal results are obtained using a rigid to flexible epoxy resin weight ratio in the range between about 1 to 1 to about 3 to 1.

Although a number of curing agents have been used successfully for curing epoxy resins, we found that for the present invention only boron trifluoride-organic base complex materials are suitable. Among them, the amine complex, particularly boron trifluoride monoethyl amine complex ($BF_3MEA$) and boron trifluoride piperidine complex appear to give more superior results. These complexes are well known and available commercially or they can be prepared by reacting a boron trifluoride-ether complex with a desirable base amine, such as methyl amine, ethyl amine, propyl amine, aniline, toluidine and piperidine, in an ether reaction medium. From the point of economy, commercial availability, ease of handling and other chemical and physical properties, $BF_3MEA$ is the preferred curing agent for the epoxy resin composition of this invention.

More clearly to illustrate the invention, specific embodiments are described hereinbelow with reference to the accompanying drawings wherein:

FIG. 1 is an apparatus for coating the electrical conductors, and

FIG. 2 is the coated electrical conductor of this invention.

In accordance with the method of this invention, bare metallic electrical conductor 10 passes over wheel 11 which rotates at a speed corresponding to the linear travelling speed of the conductor 10. The wheel 11 picks up epoxy resin from tank 12 and coats it onto the bare metallic conductor. A stripping die 13 positioned about 3 inches from the wheel is used to strip off the excess resin and to provide a uniform coating. The excess resin drips back to the tank for reuse. The coated electrical conductor 14 is then passed into an oven 15 for baking to produce an insulated electrical conductor 16 as shown in FIG. 2. The $BF_3$ complex cured epoxy resinous coating 17 tightly adhered to the metallic electrical conductor 10. Other coating apparatus may also be used.

Using the conventional wire coater described above, it is found that one coat provides sufficient buildup on the conductor to give the required dielectric strength for the magnet wire. For thicker build-up, two coats may be used. The thickness of the build-up is also governed by the stripping die 13. As a rule, a 1 to 2 mils build-up per coat is desired.

The viscosity of epoxy composition in tank 12 depends on the particular resins used. For easy application, the viscosity of the bath can be adjusted by raising its temperature. Generally, the temperature of the bath is kept between room temperature to about 78° C. Above this temperature, it is found that the crosslinking is such that further reduction of the viscosity substantially lessens its pot life. Conversely, if the temperature of the resin is much below room temperature, suitable epoxy resins cannot provide a sufficiently low viscosity for convenient handling. A typical bath temperature is about 49° C. to about 78° C.

The oven 15 used for baking the coated enamel can be any type that provides indirect substantially even heat up to 800° C. The baking temperature of this invention varies considerably depending on the exact resinous composition, the curing agent, additives, thickness and other governing factors. However, the baking temperature is preferred to be substantially above the flash point of the resinous components in a temperature range between about 310° C. to 750° C. The time required to cure the epoxy coating also varies widely depending on the baking temperature and other factors mentioned above. When the enamel coating is baked within the temperature range stated above, the curing time is extremely short. It is within the range of about 6 seconds to about 25 seconds. In a continuous process, the curing time is adjusted conveniently depending on the length of the oven and the temperature therein. For an oven 10 to 14 feet long, the traveling speed of the wire is about 20 feet per minute to about 60 feet per minute. The oven can be a single unit or multiple smaller units joined together to provide the required length.

Specific examples are described hereinbelow further to illustrate applicants' invention.

EXAMPLE 1

A 100 percent solids epoxy coating composition consisting of:

| | Percent by weight |
|---|---|
| Epon #815 (rigid) | 60.7 |
| Epon #872 (flexible) | 34.4 |
| $BF_3MEA$ | 4.9 | is prepared by mixing first the two liquid epoxy components. The curing agent $BF_3MEA$ is then dissolved into the resin. The viscosity of the mixture is 15,000 cps. at room temperature which is adjusted to about 200 to 400 cps. by raising the bath temperature to about 49° C. to 78° C. This bath then is to coat an AWG #23 round copper wire in accordance with the procedure previously described. The speed of the wire is maintained at about 50 ft./min. through five 2-foot ovens with a temperature range between 400° C. to 430° C. in a reducing atmosphere. The resultant magnet wires were examined with the following physical results obtained:

| | |
|---|---|
| Dielectric strength (volts/mil) | 2532. |
| I.T.C. Scrape | 471 gms. |
| Flexibility and adhesion | Snap o.k.+3× o.k. |
| Concentricity | 1 to 1.2. |
| Thermoplastic flow | 306° C. |
| Build-up | 1.2 mils. |
| Solvent resistance | All o.k. |

After 5 weeks aging:

| | |
|---|---|
| Flexibility and adhesion | Snap o.k.+3× o.k. |

The dielectric strength was determined by the NEMA twist test procedure. Two samples of magnet wire were twisted together for a distance of 4.75 inches. The tension of the wire while it was being twisted was 4 ounces and the number of twists was 20 turns. The tension and the number of turns depend on the wire size in accordance with the established standard. A 60-cycle voltage of substantially sinusoidal wave form was applied between the two wires. The voltage started at zero and increased at a rate of approximately 500 volts per second until breakdown occurred. If breakdown occurred in less than 5 seconds, the rate of increase in voltage on additional samples was reduced sufficiently so that breakdown would occur in not less than 5 seconds. The breakdown voltage was measured with a meter calibrated in R.M.S. volts.

The I.T.C. Scrape, which tests the scrape resistance of the magnet wire, was determined by scraping the wire in one direction with a 9 mil music wire at 16 inches per minute while the load was increased. The value was the load in grams when insulation failed.

The flexibility and the adhesion of the magnet wire were determined by rapid elongation (snap test) and a gradual elongation test. In the snap test, after jerking a sample of finished wire, having an effective length of 10 inches, to the braking point, the film of epoxy showed no visible cracks or ruptures. In the gradual elongation test, after slowly elongating a sample of the finished wire, 20 percent (or to the breaking point of the copper, if this is less than 20 percent), of the wire withstood winding ten turns around a mandrel three times the diameter of the bare wire with no indication of cracks or ruptures in the epoxy film.

The thermoplastic flow temperature for a round wire is determined by placing a specimen of finished wire horizontally on a steel plate with a similar specimen placed across the first at right angles to it. The two specimens were pressed together with the weight specified in Table 2. The conductors of the specimens were connected to a 110-volt alternating-current supply through an argon lamp. The assembly was then placed in an oven in which the temperature was increased uniformly at the rate of not more than 0.5° C. per minute until the specimens were shorted and caused the lamp to light. The oven temperature was rapidly raised to 50° C. below the specified minimum thermoplastic flow temperature before starting the oven test. The temperature of the plate directly beneath the specimens was determined with thermocouples, and was taken as the temperature of the insulation.

TABLE 2

Thermoplastic-flow-test weights (for round wire)

| Wire sizes (AWG), inclusive: | Weight, (minimum) all types B, L, H, M, T, and K, grams |
|---|---|
| 4 to 24 | 1,000 |
| 25 to 26 | 600 |
| 27 to 29 | 300 |
| 30 to 32 | 150 |
| 33 to 35 | 75 |
| 36 to 38 | 50 |

For rectangular wires thermoplastic flow shall be determined by placing a specimen of finished wire flatwise on a steel plate. A pressure of 1,000 grams shall be applied to the upper surface of the specimen by means of a ⅟₁₆-inch-diameter steel ball. The conductor of the specimen and the ball shall be connected to a 110-volt alternating-current supply through an argon lamp. The assembly shall then be placed in an oven in which the temperature shall be increased uniformly at the rate of not more than 0.5° C. per minute until the ball and specimen are shorted and cause the lamp to light. The oven temperature shall be rapidly raised to 50° C. below the specified minimum thermoplastic flow temperature before starting the oven test. The temperature of the plate directly beneath the specimen shall be determined with thermocouples, and is taken as the temperature of the insulation.

The solvent resistance of the epoxy coated magnet wire was determined by using five samples of magnet wire immersed, without bending, in the liquid listed below at room temperature, each sample to be immersed in one liquid only:

Petroleum naphtha.
Commercial grade 3° toluol.
Denatured ethyl alcohol.
5% sulfuric acid.
1% potassium hydroxide.

After 24 hours immersion in the specified liquid, the magnet wire coating was not softened sufficiently to allow its removal to the bare copper when the wire was drawn once without stretching between the folds of a cheesecloth wiper pressed firmly between the forefinger and the ball of the thumb. The wiper consisted of four thicknesses of cheesecloth folded over the magnet wire. Any removal of the coating caused by kinks or mechanical injury was not considered as failure. The test was made within 2 minutes after the sample was removed from the solvent.

It was found the pot life of the bath at room temperature is over 6 months. The pot life at the application temperature is at least 8 hours. By replenishing the catalyzed resin used, the pot life can be extended indefinitely.

Examples 2–6

100% solids epoxy coating composition having the following compositions were prepared and coated on AWG #23 copper wires in a similar fashion as described in Example 1.

| Example | Composition | Weight percent |
|---|---|---|
| 2 | DEN #438 | 67.3 |
|   | DER #732 | 28.8 |
|   | BF₃MEA | 3.9 |
| 3 | Epon 815 | 58.5 |
|   | Epon 872 | 33.2 |
|   | BF₃MEA | 8.3 |
| 4 | Epon 815 | 56.0 |
|   | Epon 872 | 33.7 |
|   | BF₃MEA | 12.3 |
| 5 | Epon 815 | 47.5 |
|   | Epon 872 | 47.5 |
|   | BF₃MEA | 5.0 |
| 6 | Epon 815 | 59 |
|   | Epon 872 | 34 |
|   | BF₃ Piperidine | 7 |

The baths were maintained at temperatures between 49° C. to 78° C. The wire travelled at a speed range between 40 ft./min. to 50 ft./min. and passed through five 2-foot ovens maintained at a temperature range from 400° C. to 430° C. (and in a reducing atmosphere). The resultant magnet wires were examined and the following range of physical data obtained:

Dielectric strength (volts/mil) _____ 1454 to 2532.
I.T.C. scrape _____ 460 to 471 gms.
Flexibility and adhesion _____ Snap o.k.+3× o.k.
Concentricity _____ 1 to 1.2 to 1 to 1.6.
Thermoplastic flow _____ 285° C. to 306° C.
Build-up _____ 0.6 mil to 1.2 mil.
Solvent resistance _____ All o.k.

After 5 weeks aging:

Flexibility and adhesion _____ Snap o.k.+3× o.k.

It was found that the preferred composition is within the ranges listed below:

|   | Percent |
|---|---|
| Rigid epoxy resin | 47.5 to 67.3 |
| Flexible epoxy resin | 28.8 to 47.5 |
| BF₃ amine complex | 3.9 to 12.3 |

Examples 7–10

While epoxy coated magnet wire prepared in accordance with previously described examples shows excellent flexibility, good adhesion to the metallic conductor, high thermoplastic flow temperature, good dielectric strength and good solvent resistance, other additives can be used to improve one or more specific properties. The following examples are used to illustrate the use of a polyamide resin as an additional curing agent. While a number of polyamides can be incorporated successfully into the resinous composition of the present invention, we found Versamid 140 manufactured by General Mills, Inc. to be particularly suitable. Versamid 140 has the following properties:

Amine value _____ 350–400
Melting point ° C. _____ Fluid
Viscosity 75° C. _____cps__ 200–600

Amine value is milligram of KOH equivalent to the base content of one gram of polyamide as determined by titration with HCl. Other polyamide resins that can be used are the condensation polymers of dimerized (and trimerized) vegetable oil, unsaturated fatty acids and aryl or alkyl polyamines. Using polyamide, the curing time is further shortened to about 6 to 10 seconds at a relatively higher temperature ranging from 550° to 700° C. Polyamide as an additional curing agent improves the dielectric strength to above 4,000 volts per mil.

Specific compositions showing the use of Versamid 140 in the epoxy composition and the physical properties of the resultant magnet wire are listed below:

Example 7

One coat only— Percent by weight
  Epi Rez #508 _____ 54.5
  Epi Rez #5145 (formerly #2952) _____ 28.0
  Boron trifluoride monoethanolamine _____ 2.9
  Versamid #140 (General Mills) _____ 14.6

Example 7A

Using 8 feet of gas-fired ovens (four 2-foot ovens in a reducing atmosphere, the wire traveling at 60 ft./min. and at temperatures of 520° C., 600° C., 580° C., 610 C.— one coat only—the following physical properties were recorded:

I.T.C. scrape _____ 600 gms.
General Electric scrape _____ 8.
Build-up _____ 1.6 mil using #45 die.
Breakdown voltage (volts) ___ 4167.
Dielectric strength) (volts/mil) _____ 2600.
Flexibility and adhesion _____ Snap o.k.+2× o.k.
5-step flex _____ All o.k.
Heat shock _____ 1st 3 o.k. to St. 1×.
Concentricity _____ 1 to 1¼.
Continuity _____ 19 breaks per min. at 1500 volts.
Solvent resistance _____ All o.k.
Thermoplastic flow _____ 269° C.

EXAMPLE 7B 45 ft./min. oven temperatures at 520° C.; 590° C., 585° C., 620° C. (and in a reducing atmosphere):

I.T.C. Scrape _____ 700 gms.
General Electric Scrape _____ 23.
Build-up _____ 1.5 same die.
Breakdown voltage (volts)___ 4700.
Dielectric strength (volts/mil) _____ 3253.
Flexibility and adhesion _____ Snap o.k. +3× o.k.
Thermoplastic flow _____ 290° C.+
5-step flex _____ All o.k.
Heat shock _____ 1st 3 steps o.k. (3×, 10%–3×, 1×).
Concentricity _____ 1 to 1¼.
Continuity _____ 37 breaks per min. at 1500 volts.
Heat age _____ 3× o.k.

After 90 days' aging at room temperature:
No appreciable change.

EXAMPLE 8

One coat only— Percent by weight
  Epi Rez #508 _____ 51.94
  Epi Rez #5145 _____ 26.76
  BF₃MEA _____ 2.78
  Versamid #140 _____ 18.52

The wire travelled at 45 ft./min. with the oven temperatures at 510° C., 590° C., 590° C., 580° C. (and in a reducing atmosphere):

I.T.C. Scrape _____ 580 gms.
General Electric Scrap _____ 12.
Build-up _____ 1.4.
Breakdown voltage (volts) __ 4267.
Dielectric strength (volts/mil) _____ 3040.
Flexibility and adhesion ____ Snap o.k. +2× o.k.
5-step flex _____ All o.k.
Heat shock _____ 3× and 10%–3× o.k. 1 hr. at 130° C.
Thermoplastic flow _____ 251° C.
Concentricity _____ 1 to 1¼.
Continuity _____ 82 breaks per min. at 1500 volts.
Solvent resistance _____ All o.k.

EXAMPLE 9

One coat only— Percent by weight
  Epi Rez #508 _____ 56.60
  Epi Rez #5145 _____ 30.20
  BF₃MEA _____ 3.03
  Versamid #140 _____ 10.17

The wire travelled at 45 ft../min. and at the oven temperatures of 520° C., 595° C., 600° C., 610° C.

I.T.C. Scrape _____ 613 gms.
General Electric Scrape _____ 5.
Build-up _____ 1.4.
Breakdown voltage (volts) __ 2530.
Dielectric strength (volts/mil) _____ 1800.
Flexibility and adhesion _____ Snap, +3× o.k.

The main difference in the three examples is the percentage of Versamid #140 used. Example 7B has good physical and electrical properties. Example 8 has lower scrape and Example 9 has lower dielectric properties. It was found that the best results were obtained using a composition containing about 14 to 16 weight percent of Versamid 140 (about 5 parts to 8 parts Versamid per 100 parts resins).

EXAMPLE 10

To obtain better continuity, two coats can be used; using a #45 and a #45½ die at the following temperatures and using 10 feet of ovens instead of 8 feet, 580° C., 600° C., 600° C., 580° C., 520° C., 45 ft./min.

Coating Compositions: Percent by weight
  Epi Rez #508 _____ 54.5
  Epi Rez #5145 _____ 28.0
  Boron trifluoride monoethanolamine _____ 2.9
  Versamid #140 _____ 14.6

Physical properties—
I.T.C. Scrape _____ 957 gms.
General Electric Scrape ____ 22.
Breakdown voltage (volts) __ 7867.
Dielectric strength (volts/mil) _____ 3420.
Fexibility and adhesion_____ Snap o.k. +2× o.k.
5-step flex _____ All o.k.
Heat shock _____ 3×, 10%–3×, 1× o.k.
Thermoplastic flow _____ 247° C.
Solvent resistance _____ All o.k.
Build-up _____ 2.4 mils.
Concentricity _____ 1 to 1¼.
Continuity _____ 1 break per min. at 2500 volts.

Similar to previous examples, the range of the rigid epoxy resin to the flexible epoxy resin can vary from about 50 to about 70 parts rigid epoxy to about 30 parts to about 50 parts flexible epoxy resins. The best results were obtained with 54.5 parts of rigid to 28 parts by weight of flexible epoxy. The $BF_3$ amine complex can range from 1 part to 15 parts per 100 (phr.), and we found between 2 to 4 phr. to be best.

General Electric (G.E.) Scrape is another test used to determine the scrape resistance of the epoxy coated wire. The scrape-resistance tester is a device that repeatedly scrapes the surface of the coated wire at right angles to the length of the wire with a weighted No. 11 steel needle (0.016 inch in diameter). In the test, two 12-inch samples of wire were used. Each sample was wiped with a clean cloth to remove the lubricant and was straightened by elongating slightly (1%) to remove kinks. After the wire was inserted in the test apparatus, the weighted needle was lowered gently to the surface of the epoxy coating and tests were made at 0, 120 and 240° around the periphery of the wire at a frequency of 60 strokes per minute using weights as shown in Table 3. The length of the scrape motion in one direction is ⅜ inch. A stroke consists of a 360° rotation of the eccentric driving mechanism.

TABLE 3.—ABRASION-SCRAPE LOAD

| Wire Size | Type SEP | Type HEP | Type TEP | Type QEP |
|---|---|---|---|---|
| | | Load in Grams | | |
| AWG: | | | | |
| 10 | 660 | 920 | 1,070 | 1,200 |
| 11 | 660 | 920 | 1,070 | 1,200 |
| 12 | 660 | 920 | 1,070 | 1,200 |
| 13 | 660 | 920 | 1,070 | 1,200 |
| 14 | 630 | 880 | 1,030 | 1,130 |
| 15 | 590 | 830 | 980 | 1,070 |
| 16 | 550 | 780 | 930 | 1,010 |
| 17 | 520 | 740 | 880 | 960 |
| 18 | 490 | 700 | 840 | 910 |
| 19 | 460 | 660 | 780 | 850 |
| 20 | 430 | 620 | 730 | 800 |
| 21 | 400 | 580 | 680 | 750 |
| 22 | 370 | 540 | 640 | 700 |
| 23 | 350 | 500 | 600 | 660 |
| 24 | 330 | 470 | 560 | 620 |
| 25 | 310 | 440 | 520 | 580 |
| 26 | 290 | 410 | 480 | 540 |
| 27 | 270 | 380 | 450 | 500 |
| 28 | 250 | 350 | 420 | 470 |
| 29 | 230 | 330 | 380 | 440 |
| 30 | 210 | 300 | 350 | 410 |

The heat shock of the wire was measured in one or all three separate tests:

(1) (3×) A sample of a finished wire was wound 10 turns around a mandrel three times the bare diameter evenly and without excessive tension or unnecessary additional bending. It was then baked in an air circulated oven for 1 hour at 155° C.±2.5° C. After cooling to room temperature, the samples were examined for cracks or ruptures. The wires were certified as "o.k." where there were no cracks or ruptures on their coatings.

(2) (10% 3×) A sample of coated wire was elongated 10% and wound on a mandrel three times the bare wire diameter and was placed in an air circulated oven for 1 hour at 125° C.±2.5° C. The wires indicated as "o.k." showed no indication of cracks or ruptures.

(3) (1×) A sample of finished wire was wound 10 times around a mandrel, one time the bare diameter, evenly and without excessive tension or unnecessary additional bending. It was baked in an air circulated oven at 155° C.±2.5° C. After cooling to room temperature, the samples were examined for cracks or ruptures and the one certified as "o.k." had no cracks or ruptures of the coatings.

The 5-step flex is another form for testing the flexibility of the wire. The coated wire samples were examined for cracks after the following testing procedures:
(1) winding around a 3-diameter mandrel;
(2) stretching the conductor 10% and winding around a 3-diameter mandrel;
(3) winding around a 1-diameter mandrel;
(4) stretching the wire 10% and winding around a 1-diameter mandrel; and
(5) stretching the wire 25% and winding around a 1-diameter mandrel.

The continuity of the epoxy coated wire was tested by passing 100 feet of wire through a 1 inch±¹⁄₁₆-inch mercury bath at a speed of 100 feet per minute±10%. The test circuit was so arranged that the discontinuity indicating device will operate when the resistance between the wire and the mercury bath is less than 5,000 ohms, but will not operate when the resistance is 10,000 ohms or more.

EXAMPLE 11

Hexamethoxymethylmelamine, when used in conjunction with urea formaldehyde in the composition of the present invention, also gives a good epoxy coated magnet wire. Typical formulations fall within the ranges:

| | Percent |
|---|---|
| Rigid epoxy resin | 50–64 |
| Flexible epoxy resin | 24–40 |
| $BF_3$ amine complex | 4–10 |
| Urea formaldehyde | 2–17 |
| Hexamethoxymethylmelamine | 2–20 |

These formulations cured in 10 to 15 seconds at 380°–400° C., (in a reducing atmosphere). The resultant magnet wire exhibits flexibility, good adhesion, high thermoplastic flow, good electric strength, and good solvent resistance.

EXAMPLES 12 and 13

In addition to the rigid epoxy resins described previously, we find that high melting point rigid epoxy resins based on the condensation of epichlorohydrin and bisphenol A of high molecular weight can also be used successfully in the epoxy resin system described. Typical of this type of epoxy resins, for example, are the Jones-Dabney Co. Epi Rez 530–C, Epi Rez 540–C, Epi Rez 550, and Epi Rez 560 which have the following product specifications.

| | Epi Rez 530–C | Epi Rez 540–C | Epi Rez 550 | Epi Rez 560 |
|---|---|---|---|---|
| Color | 3 max.[1] | 4 max.[1] | 4 max.[1] | 6 max.[2] |
| Melting point (° C.) | 95–105 | 127–133 | 145–155 | 165–180 |
| Weight per epoxide | 860–1,015 | 1,600–2,000 | 2,400–4,000 | 4,000–6,000 |

[1] Gardner-Holdt, 40% solids in butyl carbitol.
[2] Gardner-Holdt, 30% solids in butyl carbitol.

Typical formulations using this type of resin together with the resultant physical properties of coated metal wire are shown below:

EXAMPLE 12

| | Percent weight |
|---|---|
| Epi Rez #510 (rigid low molecular weight) | 50.6 |
| Epi Rez #5145 (flexible low molecular weight) | 30.8 |
| Epi Rez #560 (rigid high molecular weight) | 4.32 |
| Paratoluene sulfonic acid | .87 |
| $BF_3MEA$ | 2.66 |
| Melamine formaldehyde MF 712 | 10.00 |
| Stannous octoate | .75 |

Coating 2 coats at 60 f.p.m. with a total of 10 feet of oven (in 2 foot sections) with temperatures of 620° C., 650° C., 660° C., 645° C., 604° C., results were:

I.T.C. Scrape _____ From 900 to 1030 gms.
General Electric
  Scrape _____ From 12–16 strokes.
Breakdown voltage
  (volts) _____ 6500.
Dielectric strength
  (volts/mil) _____ 2955.
Build-up _____ 2.5.

Flexibility and
adhesion _____ Snap o.k. plus 2× o.k.
Mandrel pull _____ 11.
5-step flex _____ 3× o.k., 10% 3× o.k.,
1× o.k., 10% 1× o.k.,
25% 1× o.k.
Heat shock _____ 3× o.k., 10% 3× o.k.,
1× o.k.
Thermoplastic flow ___ 283° C.

Example 13

|  | Percent weight |
|---|---|
| Epi Rez #510 | 58.40 |
| Epi Rez #5145 | 35.62 |
| Epi Rez #560 | 4.98 |
| Paratoluene sulfonic acid | 1.00 |
| BF$_3$MEA | 2.65 |
| Stannous octoate | .75 |

Coating two coats of #18 wire at 50–60 f.p.m. with 10½ feet of oven (in two foot sections) with temperatures of 610° C., 675° C., 685° C., 690° C. and 560° C., results were:

| I.T.C. Scrap | 991 gms. |
|---|---|
| General Electric Scrape | 19. |
| Breakthrough voltage (volts) | 7750. |
| Dielectric strength (volts/mil) | 2673. |
| Build-up | 2.9. |
| Flexibility and adhesion | Snap o.k. + 3× o.k. |
| Mandrel pull | 8–9. |
| 5-Step flex | 3× o.k., 10% 3× o.k., 1× o.k., 10% 1× o.k., 25% 1× o.k. |
| Heat shock | 3× o.k., 10% 3× o.k. |
| Thermoplastic flow | 255° C. |
| Heat age 1 week at 130° C. | 2× o.k. |

It was found the best ranges for this type of formulation are as follows:

|  | Percent weight |
|---|---|
| Epi Rez #510 | 40–60 |
| Epi Rez #5145 | 25–35 |
| Epi Rez #560 | 1–7.5 |
| Paratoluene sulfonic acid | .5–1.5 |
| BF$_3$MEA | 1.0–3.0 |
| Melamine formaldehyde | 2–10 |
| Stannous octoate | .2–1.0 |

Instead of stannous octoate, lead octoate can be used. Using this composition the coated wire cured in 6 to 10 seconds at 550° C. to 730° C. in a reducing atmosphere.

We claim:

1. A method for producing an insulation coating on an electrical conductor which comprises covering said conductor with a substantially solvent-free coating composition comprising a rigid epoxy resin, a flexible epoxy resin and a BF$_3$ containing curing agent, and curing the resinous coating onto said wire at a temperature substantially above the flash point of said coating composition for a period shorter than that required for the degradation of said compositions.

2. A method for producing an insulation coating on an electrical wire which comprises covering said wire with a substantially solvent-free coating composition comprising a rigid epoxy resin, a flexible epoxy resin and a BF$_3$ organic base complex curing agent, the ratio of said rigid to said flexible resins being in the range between about 1 to 1 to about 3 to 1, and curing the resinous coating onto said wire at a temperature substantially above the flash point of said coating composition for a period shorter than that required for the degradation of said composition.

3. A method for producing an insulation coating on an electrical wire which comprises covering said wire with a substantially solvent-free coating composition comprising a rigid epoxy resin, a flexible epoxy resin and a BF$_3$ amine complex curing agent, the ratio of said rigid to said flexible resins being in the range between about 1 to 1 to about 3 to 1, and curing the resinous coating onto said wire at a temperature range between about 310° C. to about 750° C. for a period within the range of about 6 seconds to about 25 seconds in a reducing atmosphere.

4. A method for producing an insulation coating on an electrical wire which comprises covering said wire with a substantially solvent-free coating composition comprising 47.5% to 67.3% by weight of a rigid epoxy resin, 28.8% to 47.5% by weight of a flexible epoxy resin and 3.9% to about 12.3% by weight of a BF$_3$ amine complex, and curing the resinous coating onto said wire at a temperature substantially above the flash point of said coating composition for a period shorter than that required for the degradation of said composition.

5. A method for producing an insulation coating on an electrical wire according to claim 4 wherein the curing temperature is between about 310° C. to about 430° C. and the curing time is between about 10 to 15 seconds in a reducing atmosphere.

6. A method for producing an insulation coating on an electrical wire which comprises covering said wire with a substantially solvent-free coating composition comprising (I) a rigid epoxy resin selected from the group consisting of (a) diglycidyl ethers of bis-phenol A and its homologues, (b) glycidyl ethers of bis-phenol F, (c) glycidyl ethers of tetrakis (hydroxyphenol) ethane and epoxylated novolacs, (II) a flexible epoxy resin selected from the group consisting of (a) polyglycol diepoxies and (b) the polymeric condensate of an excess epoxy resin and a poly carboxylic acid with a linear structure, and (III) a BF$_3$ amine complex selected from the group comprising (a) boron trifluoride monoethyl amine complex and (b) boron trifluoride piperidine complex, the ratio of (I) and (II) being in the range between about 1 to 1 to about 3 to 1, and curing said resinous coating onto said wire at a temperature substantially above the flash point of said coating composition for a period shorter than that required for the degradation of said composition.

7. A method for producing an insulation coating on an electrical wire which comprises covering said wire with a substantially solvent-free coating composition comprising (I) 47.5% to about 67.3% by weight of a rigid epoxy resin selected from the group consisting of diglycidyl ethers of bis-phenol A and its homologues having an epoxy equivalent weight between about 140 to about 250, (II) 28.8% to 47.5% by weight of a flexible epoxy resin selected from the group consisting of polyglycol diepoxies having the following theoretical formula structure:

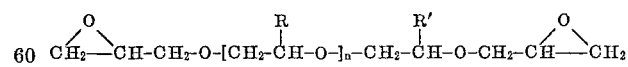

wherein R and R' is hydrogen or hydrocarbon radicals and $n$ is an integer from 1 to 11, said flexible epoxy resin having an epoxy equivalent weight from about 175 to about 335 and (III) 3.9% to about 12.3% by weight of boron trifluoride monoethyl amine complex, and curing said resinous coating onto said wire at the temperature range between 310° C. to about 430° C. and for a period between 10 to 15 seconds in a reducing atmosphere.

8. A method for producing an insulation coating on an electrical wire which comprises covering said wire with a substantially solvent-free coating composition comprising (I) 47.5% to about 67.3% by weight of a rigid epoxy resin selected from the group consisting of diglycidyl ethers of bis-phenol A and its homologues having an epoxy equivalent weight between about 140 to about 250, (II) 28.8% to 47.5% by weight of a flexible epoxy resin selected from the group consisting of condensates of an excess epoxy resin and a polycarboxylic acid with a linear structure having an epoxide equivalent weight of 650 to 750 and (III) 3.9% to about 12.3% by weight of boron trifluoride monoethyl amine complex, and curing said resinous coating onto said wire at the temperature range between 310° C. to about 430° C. and for a period between 10 to 15 seconds in a reducing atmosphere.

9. A method for producing an insulation coating on an electrical wire which comprises covering said wire with a substantially solvent-free coating composition comprising a rigid epoxy resin, a flexible epoxy resin, a BF₃ amine complex curing agent and a polyamide resin, the ratio of said rigid to said flexible resins being in the range from about 50 to about 70 parts rigid epoxy to 1 to about 30 to about 50 parts flexible epoxy resin, and said BF₃ amine complex range from 1 part to 15 parts per 100, and curing the resinous covering onto said wire at the temperature from 550° to 700° C. for a period of 6 to 10 seconds in a reducing atmosphere.

10. A method for producing an insulation coating on an electrical wire according to claim 9 wherein said polyamide resin is selected from the group consisting of condensation polymers of dimerized and trimerized vegetable oil, unsaturated fatty acids, and aryl and alkyl polyamines.

11. A method for producing an insulation coating on an electrical wire according to claim 9 wherein said polyamide has an amine value range from 350 to 400.

12. A method for producing an insulation coating on an electrical wire which comprises covering said wire with a substantially solvent-free coating composition comprising (I) a rigid epoxy resin selected from the group consisting of diglycidyl ethers of bis-phenol A and its homologues having an epoxy equivalent weight between about 140 to about 250, (II) a flexible epoxy resin selected from the group consisting of polyglycol diepoxies having the following theoretical formula structures:

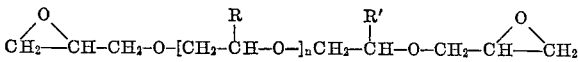

wherein R and R' is hydrogen or hydrocarbon radicals and n is an integer from 1 to 11, said flexible epoxy resin having an epoxy equivalent weight from about 175 to about 335, (III) boron trifluoride monoethyl amine complex and (IV) a polyamide resin selected from the group consisting of condensation polymers of dimerized and trimerized vegetable oil, unsaturated fatty acids and aryl and alkyl polyamides, the ratio of (I) and (II) in the composition being between about 50 to about 70 parts rigid to about 30 to about 50 parts flexible epoxy resins, the BF₃ monoethyl amine in the composition being 1 part to 15 parts per 100 parts of resins and the polyamides used ranging from 5 to about 8 parts per 100 parts of resins, and curing said resinous coating onto said wire at the temperature range between 550° C. to about 700° C. and for a period between 6 to 10 seconds in a reducing atmosphere.

13. A method for producing an insulation coating on an electrical wire according to claim 12 wherein said polyamide has an amine value between 350 to 400.

14. A method for producing an insulation coating on an electrical wire which comprises covering said wire with a substantially solvent-free coating composition comprising (I) a rigid epoxy resin selected from the group consisting of diglycidyl ethers of bis-phenol A and its homologues having an epoxy equivalent weight between about 140 to about 210, (II) a flexible epoxy resin selected from the group consisting of condensates of an excess epoxy resin and a polycarboxylic acid with a linear structure having an epoxide equivalent weight of 650 to 750, (III) boron trifluoride monoethyl amine complex and (IV) a polyamide selected from the group consisting of condensation polymers of dimerized and trimerized vegetable oil or unsaturated fatty acids and aryl and alkyl polyamines, the ratio of (I) and (II) in the composition being between about 50 to about 70 parts rigid to about 30 to about 50 parts flexible epoxy resin, the BF₃ monoethyl amine in the composition being 1 part to 15 parts per 100 parts of resins and the polyamides used ranging from 5 to about 8 parts per 100 parts of resins, and curing said resinous coating onto said wire at the temperature range between 550° C. to about 700° C. and for a period between 6 to 10 seconds in a reducing atmosphere.

15. A method for producing an insulation coating on an electrical wire according to claim 14 wherein the polyamide has an amine value between 350 to 400.

16. A method for producing an insulation coating on an electrical wire which comprises covering said wire with a substantially solvent-free coating composition comprising (I) 50 to 64% of a rigid epoxy resin selected from the group consisting of diglycidyl ethers of bis-phenol A and it homologues having an epoxy equivalent weight between about 140 to about 250, (II 24% to 40% of a flexible epoxy resin selected from the group consisting of (a) condensates of an excess epoxy resin and a polycarboxylic acid with a linear structure having epoxy equivalent weight of 650 to 750, (b) polyglycol diepoxies having the following theoretical formula structure:

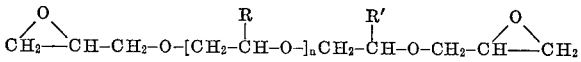

wherein R and R' is hydrogen or hydrocarbon radicals and n is an integer from 1 to 11, (III) 4 to 10% BF₃ monoethyl amine complex, (IV) 2% to 17% urea formaldehyde and (V) 2% to 20% hexamethoxy-methylmelamine, said percentages being percent by weight, and curing the coating in 10 to 15 seconds at 380° to 400° C. in a reducing atmosphere.

17. A method for producing an insulation coating on an electrical wire which comprises covering said wire with a substantially solvent-free coating composition comprising (I) 40% to 60% of a rigid epoxy resin selected from the group consisting of diglycidyl ethers of bis-phenol A and its homologues having an epoxy equivalent weight between about 140 to about 250, (II) 25% to 35% of a flexible epoxy resin selected from the group consisting of (a) condensates of an excess epoxy resin and a polycarboxylic acid with a linear structure having an epoxy equivalent weight of 650 to 750, (b) polyglycol diepoxies having the following theoretical formula structure:

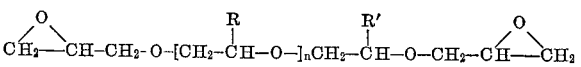

wherein R and R' is hydrogen or hydrocarbon radicals and n is and integer from 1 to 11, (III) 1% to 7.5% of a high melting point rigid epoxy resin based on the condensation of epichlorohydrin and bis-phenol A having weight per epoxide range from 860 to 6000, (IV) 0.5% to 1.5% paratoluene sulfonic acid, (V) 1.0% to 3.0% BF₃ monoethyl amine, (VI) 2% to 10% melamine formaldehyde, and (VII) 0.2% to 1.0% stannous octoate, and curing the coating in 6 to 10 seconds at 550° C. to 730° C. in a reducing atmosphere.

18. A magnet wire comprising a metallic conductor and coated theron a BF₃ organic based complex cured 100% solids coating formulation which consists essentially of (I) a rigid epoxy resin and (II) a flexible epoxy resin, the ratio of (I) and (II) being between about 1 to 1 to about 3 to 1.

19. A magnet wire comprising a metallic conductor and coated thereon a BF₃ amine complex cured 100% solids coating formulation which consists essentially of (I) a rigid epoxy resin selected from the group consisting of diglycidyl ethers of bis-phenol A and its homologues, glycidyl ethers of bis-phenol F, glycidyl ethers of tetrakis (hydroxyphenyl) ethane and epoxylated novolacs and (II) a flexible epoxy resin selected from the group consisting of (a) polyglycol diepoxies with the following theoretical formula structure:

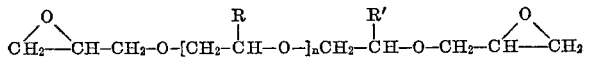

wherein R and R' is hydrogen or hydrocarbon radicals and $n$ is an integer from 1 to 11 and having epoxy equivalent weight ranging from 175 to 335, and (b) condensates of an excess epoxy resin and a polycarboxylic acid with a linear structure having epoxide equivalent weight ranging from 650 to 750, the ratio of (I) and (II) being between about 1 to 1 to about 3 to 1.

20. A magnet wire comprising a metallic conductor and coated thereon a $BF_3$ monoethyl amine complex cured 100% solids coating formulation which consists essentially of (I) a rigid epoxy resin selected from the group consisting of glycidyl ethers of bis-phenol A and its homologues having epoxy equivalent weight ranging from 140 to 250 and (II) a flexible epoxy resin selected from the group consisting of (a) polyglycol diepoxies with the following theoretical formula structure:

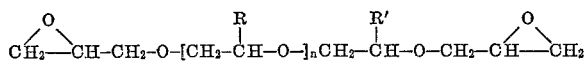

wherein R and R' is hydrogen or hydrocarbon radicals and $n$ is an integer from 1 to 11 hand having epoxy equivalent weight ranging from 175 to 335, and (b) condensates of an excess epoxy resin and a polycarboxylic acid with a linear structure having epoxide equivalent weight ranging from 650 to 750, the ratio of (I) and (II) being between about 1 to 1 to about 3 to 1, the amount of said amine used for curing said epoxies being in the range between 1 part to 15 parts amine per 100 parts epoxy resins.

21. A magnet wire comprising a metallic conductor and coated thereon a cured 100% solids coating formulation which consists essentially of (I) a rigid epoxy resin selected from the group consisting of diglycidyl ethers of bis-phenol A and its homologues, glycidyl ethers of bis-phenol F, glycidyl ethers of tetrakis (hydroxyphenyl) ethane and epoxylated novolacs and (II) a flexible epoxy resin selected from the group consisting of (a) polyglycol diepoxies with the following theoretical formula structure:

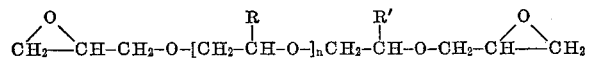

wherein R and R' is hydrogen or hydrocarbon radicals and $n$ is an integer from 1 to 11 and having epoxy equivalent weight ranging from 175 to 335, and (b) condensates of an excess epoxy resin and a polycarboxylic acid with a linear structure having epoxide equivalent weight ranging from 650 to 750, the ratio of (I) and (II) being between about 1 to 1 to about 3 to 1, said epoxies being cured by a $BF_3$ amine complex and a polyamide selected from the group consisting of condensation polymers of dimerized and trimerized vegetable oil, unsaturated fatty acids and aryl and alkyl polyamines, the range of said $BF_3$ amine complex used being between 1 part to 15 parts per 100 parts epoxies and said polyamide used being between 5 parts to 8 parts per 100 parts epoxies.

22. A magnet wire comprising a metallic conductor and coated thereon a $BF_3$ monoethyl amine complex cured 100% solids coating formulation which consists essentially of (I) 50% to 64% by weight of (a) rigid epoxy resin selected from the group consisting of glycidyl ethers of bis-phenol A and its homologues having epoxy equivalent weight ranging from 140 to 250, (II) 24% to 40% by weight of a flexible epoxy resin selected from the group consisting of (a) polyglycol diepoxies with the following theoretical formula structure:

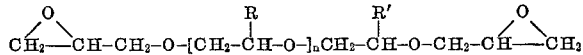

wherein R and R' is hydrogen or hydrocarbon radicals and $n$ is an integer from 1 to 11 and having epoxy equivalent weight ranging from 175 to 335, and (b) condensates of an excess epoxy resin and a polycarboxylic acid with a linear structure having epoxy equivalent weight ranging from 650 to 750, (III) 4% to 10% by weight $BF_3$ monoethyl amine complex, (IV) 2% to 17% by weight urea formaldehyde and 2% to 20% by weight of hexamethoxymethylmelamine.

23. A magnet wire comprising a metallic conductor and coated thereon a $BF_3$ monoethyl amine complex cured 100% solids formulation which consists essentially of (I) 40% to 60% by weight of a rigid epoxy resin selected from the group consisting of glycidyl ethers of bis-phenol A and its homologues having epoxy equivalent weight ranging from 140 to 250, (II) 25% to 35% by weight of a flexible epoxy resin selected from the group consisting of (a) polyglycol diepoxies with the following theoretical formula structure:

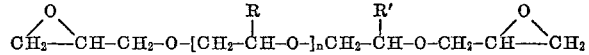

wherein R and R' is hydrogen or hydrocarbon radicals and $n$ is an integer from 1 to 11 and having epoxy equivalent weight ranging from 175 to 335, and (b) condensates of an excess epoxy resin and a polycarboxylic acid with a linear structure having epoxy equivalent weight ranging from 650 to 750, (III) 1% to 7.5% by weight of a high melting point rigid epoxy resin based on the condensation of epichlorohydrin and bis-phenol A having weight per epoxy ranging from 860 to 6000, (IV) 0.5% to 1.5% by weight of paratoluene sulfonic acid, (V) 1.0% to 3.0% by weight of $BF_3MEA$, 2% to 10% by weight of melamine formaldehyde and 0.2% to 1.0% by weight of stannous octoate.

References Cited

UNITED STATES PATENTS

| | | |
|---|---|---|
| 2,631,138 | 3/1953 | Dannenberg. |
| 2,705,223 | 3/1955 | Renfrew et al. |
| 2,730,467 | 1/1956 | Daszewski _____ 117—232 |
| 2,935,488 | 5/1960 | Phillips et al. |
| 2,970,983 | 2/1961 | Newey. |
| 2,990,383 | 6/1961 | Glaser. |
| 3,086,888 | 4/1963 | Stratton et al. |
| 3,114,727 | 12/1963 | Hensley. |
| 3,239,580 | 3/1966 | Pendleton et al |
| 3,251,708 | 5/1966 | Schmatterer et al. |
| 3,272,647 | 9/1966 | Swanson et al. |
| 3,299,169 | 1/1967 | Smith. |

OTHER REFERENCES

H. Lee and K. Neville; Epoxy Resins, McGraw-Hill Book Company, Inc.; New York; pp. 111–113, 158, 216–217, 223–224, 265–267, and 275–277; 1957.

ALFRED L. LEAVITT, Primary Examiner.

C. K. WEIFFENBACH, Assistant Examiner.

U.S. Cl. X.R.

117—128.4, 132; 260—830